3,264,376
OIL DISPERSANT GRAFT COPOLYMERS OF VINYL ACETATE ONTO A POLYMERIC ALKYL ACRYLATE BACKBONE
La Verne N. Bauer, Cheltenham, Pa., assignor to Rohm & Haas Company, Philadelphia, Pa., a corporation of Delaware
No Drawing. Filed Mar. 30, 1962, Ser. No. 183,720
14 Claims. (Cl. 260—885)

This invention concerns novel copolymers and a method for their preparation. These copolymers are soluble in oils, whether of natural or mineral origin as from petroleum and of synthetic nature and impart thereto improved properties. This invention also deals with lubricating compositions and hydrocarbon fuels containing the novel copolymers which impart thereto dispersant properties. They may also impart other valuable properties, including improvements in viscosity, viscosity-temperature relationships, and pour depressing action.

It has previously been proposed to prepare oil-soluble copolymers from mixtures of monomers, at least some of which contain relatively large hydrocarbon groups, thus promoting solubility of the copolymer in oils. It has also been proposed to incorporate in such copolymers minor proportions of comonomers which by themselves do not yield oil-soluble polymers. Thus, there has been used vinyl acetate in conjunction with such monomers as dilauryl fumarate or maleate, the vinyl acetate serving to improve polymerization of the latter types of monomers. Whether vinyl acetate is first mixed with a fumarate or maleate or added thereto after polymerization has been initiated, the resulting polymers are deficient in dispersing activities and tend to vary considerably from batch to batch in properties.

It has now been discovered that oil-soluble copolymers can be prepared which exhibit useful dispersing activity in mineral oils and in synthetic lubricants and which can be prepared reproducibly. These copolymers comprise units from relatively cheap vinyl esters of lower carboxylic acids carried on a base polymer chain from acrylic esters which chain supplies oil-solubilizing hydrocarbon groups. The base polymer may also contain moieties from other polymerizable monoethylenically unsaturated compounds than the acrylic esters supplying oil-solubility.

The method for preparing the novel copolymers of this invention comprises first polymerizing under the influence of a free radical polymerization initiator at least one acrylic ester supplying oil-solubility, optionally with a minor proportion of at least one other free radically polymerizable monoethylenically unsaturated monomer until about 50% to 90% of said ester or said ester and said monomer have polymerized to form a mixture of base polymer and monomer, mixing with said base polymer and monomer a vinyl ester of the formula $$CH_2=CHOOCR'$$

wherein R' is an alkyl group of 1 to 3 carbon atoms, and graft copolymerizing the resultant mixture under the influence of a free radical polymerization initiator, the vinyl ester providing about 25% to 45% of the final copolymer.

The base polymer may be a homopolymer or a copolymer. A homopolymer may be prepared from an oil-soluble alkyl acrylate or methacrylate or a copolymer may be formed from a mixture of alkyl acrylates and/or methacrylates or from a mixture of one or more oil-solubilizing acrylic esters and one or more other polymerizable monoethylenically unsaturated compounds.

Acrylic esters for forming the base polymer may be summarized by the formula $$CH_2=C(R^*)COOR$$

wherein R* is hydrogen or methyl and R is an oil-solublizing group, especially an alkyl group of eight to twenty-four carbon atoms, the range of eight to eighteen being preferred. The alkyl group may be straight or branched and is best of 12 to 18 carbon atoms.

Typical acrylic esters which promote oil-solubility comprise octyl, decyl, isodecyl, dodecyl, isododecyl, tetradecyl, hexadecyl, octadecyl, eicosyl, and tetracosyl acrylates and methacrylates.

Along with one or more acrylic esters for forming the base polymer and providing oil-solubilizing groups, there may be used one or more other free radically polymerizable monoethylenically unsaturated compounds, particularly monovinylidene compounds, i.e., those having one $$CH_2=C<$$

such monomer or monomers being used in minor proportion. These include alkyl esters of maleic, fumaric, and itaconic acids (including half esters thereof), acrylic acid, methacrylic acid, maleic acid, fumaric acid, itaconic acid, maleic anhydride, acrylic amides, maleic half amides, acrylonitrile, methacrylonitrile, vinyl alkyl ethers, vinyl alkyl thioethers, styrene, alkylstyrenes, and lower alkyl acrylic esters.

Lower alkyl acrylic esters, here meaning esters having alkyl groups smaller than eight carbon atoms and derived from acrylic or methacrylic acid, are of particular interest, because in general they possess polymerizing characteristics similar to the acrylic esters which supply oil-solubility. Presence of small alkyl groups in copolymers may help improve such properites as pour point depression and viscosity index improvement. Typical lower acrylic esters are methyl, ethyl, propyl, butyl, amyl, and hexyl acrylates and methacrylates.

The hydrocarbon groups in other esters and in ethers may be small or large. Alkyl groups may range from methyl through butyl, actyl, nonyl, and dodecyl to octadecyl and mixtures. Half esters of dicarboxylic acids are of interest in supplying both the ester function and the acid function, which is often desired and which can be converted to a salt form, as with barium, strontium, calcium, or magnesium. The ester function may also be supplied by vinyl carboxylates, including such vinyl ester as later graft-copolymerized and vinyl carboxylates having more than four carbon atoms in the acid portion thereof, as in vinyl laurate or vinyl stearate. Such miscellaneous comonomers are used in minor proportions and in amounts which do not interfere with oil-solubility of the final copolymer. Of course, those having larger hydrocarbon groups may also assist in imparting oil-solubility.

In a similar way, there may be used in minor proportion polymerizable esters in which in place of an alkyl group there may be used a cycle-containing residue of an alcohol or ester-forming equivalent, typical whereof are phenyl, alkylphenyl, benzyl, cyclohexyl, alkylcyclohexyl, cyclopentyl, and dicyclopentyl. Similarly, the alcohol residue used for from a polymerizable ester or ether may contain a heteroatom, including oxygen, sulfur, nitrogen, halogen, or phosphorus. Typical of these groups are methoxyethyl, ethoxyethoxyethyl, methylthiomethyl, butoxyethyl, ethoxypropyl, methylthioethyl, chloropropyl, 4-chlorobutyl, butoxybutyl, phenoxyethyl, octylphenoxyethyl, butylphenoxyethoxyethyl, alkyloxypolyethoxyethyl in which there are up to 30 or more ether groups, cyclohexoxypropyl, benzoxyethyl, dodecylthioethoxyethyl, 2-(ethylsulfinyl)ethyl, butylsulfinylethyl, phenylsulfinylmethyl, dimethylaminoethyl, dibutylaminoethyl, tert-butylaminoethyl, dimethylaminoethoxyethyl, diethylphosphatoethyl, or diethylphosphonomethyl. Heteroatom-containing groups often help supply one or more interesting properties to the final copolymer.

Typical vinyl ethers are vinyl butyl ether, vinyl octyl ether, vinyl dodecyl ether, vinyl hydroxyethyl thioether, and vinyl tetradecyl thioether. In place of vinyl alkyl ethers there may be used vinyl ethers having a ring substituent as in vinyl phenyl ether, vinyl benzyl ether, or vinyl cyclohexyl ether.

Polymerizable amides of chief interest are acrylamide, methacrylamide, and their N-substituted derivatives, including such compounds as N-methyl, N-dimethyl, N-octyl, N-dodecyl, N-cyclohexyl, N-phenyl, N-methyl-N-benzyl, N-butoxymethyl, N-(dimethylaminoethyl), or N-β-cyanoethyl acrylamides or methacrylamides.

Usually the monomer or monomers from the above miscellaneous types are mixed with the starting acrylic ester or esters, but they may also be used in admixture with the vinyl acetate, propionate, or butyrate which is added to the base polymer to be graft-copolymerized therewith. Usually from about 1% to about 25% based on the weight of the final copolymer of such miscellaneous monomer or monomers may be used, if desired, but such use is optional. For the successful preparation of oil-soluble copolymers having dispersing action the chief source of moities must be from one or more acrylic esters which form a base polymer onto which the later added vinyl carboxylate is copolymerized. The miscellaneous monomers serve as extenders and modifiers.

To prepare copolymers having dispersing activity in oils, at least one acrylic ester supplying oil-solubility, with or without other polymerizable monovinylidene compound, is treated with a free radical polymerization initiator. This may be an organic peroxide or hydroperoxide or an azo catalyst. An especially effective initiator system comprises an organic hydroperoxide coupled with a quaternary ammonium compound as activator. Polymerization may be effected in bulk or in an organic solvent, especially in an organic solvent in which the polymers are soluble. Use of such solvent decreases viscosity of the mixture and permits a more efficient polymerization reaction.

Among solvents which may desirably be used are aromatic hydrocarbons, such as benzene, toluene, xylene, and aromatic naphthas, chlorinated hydrocarbons such as ethylene dichloride, esters such as ethyl propionate or butyl acetate, and also petroleum oils which are pure enough so as not to interfere with polymerization. Solvent may be retained with the final polymer or it may be removed therefrom. When the copolymer is to be used in a lubricating composition, the final copolymer in solvent may be mixed with a good quality mineral oil, such as 100 or 150 neutral oil, or with a synthetic lubricant and the volatile solvent evaporated from the mixture to give a solution of copolymer in oil or synthetic lubricant, such as dioctyl sebacate, dibutylphenyl phosphate, a silicate ester, or a silicone fluid.

Monomer or mixture of monomers for providing base polymer is heated with initiator to a polymerizing temperature between about 60° and 160° C. Choice of temperature or range of temperature depends in part upon the initiator system to be used and upon such other factors as choice of monomer, solvent, and concentrations. Polymerization may be initiated at one temperature and continued at other temperatures. Initiator or initiator and activator may be added in portions. Different polymerization initiators may be used at different stages of polymerization, during which solvent may be supplied or removed. The entire charge of starting monomer may be present when initiation of base polymer is undertaken or base polymer may be formed by addition of portions of starting monomer as formation of base polymer proceeds.

As initiator there is preferably used an organic hydroperoxide such as tert-butyl hydroperoxide, cumene hydroperoxide, diisopropylbenzene hydroperoxide, p-menthane hydroperoxide, pinane hydroperoxide, 2,5-dimethylhexane-2,5-dihydroperoxide, or other tert-alkyl hydroperoxide, hydrocarbon-substituted benzene hydroperoxide, or terpene hydroperoxide. The initiator may be supplied as a single charge or added in portions as polymerization progresses.

Hydroperoxides become active as initiators at lower temperatures when used in conjunction with an activator. Especially useful activators are quaternary ammonium compounds, such as benzyltrimethylammonium chloride, dibenzyldimethylammonium bromide, butyldimethylbenzylammonium chloride, cetyltrimethylammonium chloride, dodecyldimethylbenzylammonium chloride, dodecylbenzyldimethylbenzylammonium chloride, didodecenyldimethylammonium chloride, benzyldimethyldodecenylammonium chloride, octylphenoxyethyldimethylbenzylammonium chloride, nonylphenoxyethoxyethyltrimethylammonium chloride, diisobutylphenoxyethoxyethyldimethylbenzylammonium chloride, cetylpyridinium bromide, N-octyl-N-methylmorpholinium chloride, and bis quaternary ammonium salts, such as those having quaternary nitrogens linked with an alkylene chain, an amide-containing chain, or an ether-containing chain.

In place of a hydroperoxide or a hydroperoxide-activator system there may be used other free radical polymerization initiators. These include peroxides such as benzoyl peroxide, acetyl peroxide, caproyl peroxide, lauroyl peroxide, di-tert-butyl perphthalate, tert-butyl perbenzoate, 2,2-bis(tert-butylperoxy)butane, or methyl ethyl ketone peroxide. There may likewise be used an azo catalyst such as azodiisobutyronitrile, azobisdimethylvaleronitrile, azodiisobutyramide, dimethyl azodiisobutyrate, azobis(α-ethylbutyronitrile), or azobis(α,β-dimethylcapronitrile). In a useful variation of the method for preparation of copolymers of this invention a peroxide or azo catalyst is used in forming the base polymer and a hydroperoxide, preferably in conjunction with a quaternary ammonium compound, is used in the second stage.

The amount of initiator or initiators is usually between about 0.01% and about 5% of the weight of comonomers used. During formation of base polymer it is preferred to use about 0.05% to about 2.5% of the weight of monomer or monomers there used, unless a polymer of low molecular weight should be desired, in which case up to 5% or even more is supplied. In the second stage in which vinyl acetate, propionate, or butyrate is copolymerized onto the base polymer, usually about 0.1% to about 1% of initiator is added, although, as noted, sufficient catalyst or catalysts may be provided at the start to act through the entire process.

When an activator is used, it is proportioned in general to the quantity of hydroperoxide. It will usually be 5% to 40% of the weight of the initiator.

When in the first stage, in which base polymer is formed, at least about 50% of monomer or monomers have been converted to polymer, reaction with vinyl acetate, propionate, and/or butyrate is started and polymerization is continued under the influence of a free radical initiator. When more than 90% of the monomers for forming base polymer have been polymerized, the graft copolymer which then results is not so effective a dispersant as when the degree of polymerization of monomers for forming base polymer is between 50% and 90% by weight. It has been found, however, that monomers can be mixed with already formed base polymer to give an optimum mixture of starting monomers, base polymer, and the vinyl lower carboxylate. Such monomers can be mixed with base polymer or can be supplied along with the vinyl lower carboxylate.

Exact determination of extent of formation is not essential, for determinations can be made in a defined procedure for the extent of polymerization and thereafter the vinyl lower carboxylate can be supplied after the time when sufficient base polymer has been shown to be formed. When it is desired to determine extent of polymerization, this may be done by conventional methods, as by evaporation of volatile solvent and unreacted monomer and measurement of the non-volatile residue, or by precipitation of base polymer with a non-solvent therefor, separating and drying the precipitated polymer.

After copolymerization has been carried to an acceptable level of conversion, the desired copolymer may be isolated as by precipitating with a non-solvent or removing a volatile solvent and remaining monomer by heating under reduced pressure.

Usually, isolation need not be practiced and it is more convenient to transfer the final copolymer to an oil or to a synthetic lubricant to give a concentrate containing about 20% to 50% of the copolymer.

Solution of copolymer in volatile solvent is mixed with the oil or lubricant and the mixture is heated under reduced pressure. End temperatures from 100° to 160° C., desirably at pressures from 5 to 30 mm. (Hg) are useful and helpful to ensure complete removal of volatile materials from the mixtures. Such heating also causes decomposition of any remaining portions of initiator.

Copolymers may be prepared over a wide range of molecular weights by variations in known factors, such as monomers used, choice of solvent; concentration of monomer, choice catalysts and concentration thereof, temperature, time, and proportions. Molecular weights are most conveniently determined from viscosity of solutions of copolymer. They vary from about 20,000 to over 2,000,000.

Typical preparations of copolymers are described in the following illustrative examples. Parts are by weight unless otherwise designated.

*Example 1*

As a polymerization vessel there is used a round bottom, three-necked flask equipped with stirrer, addition funnel, reflux condenser, thermometer, and gas inlet tube. Before polymerization is effected, the apparatus is flushed with nitrogen and this inert atmosphere is maintained by a flow of gas throughout polymerization. The vessel is heated with an oil bath, which at the start is adjusted to give an internal batch temperature of 85°–90° C.

There are mixed 75 parts of an alkyl methacrylate in which the alkyl groups are about 67% dodecyl, about 29% tetradecyl, and about 4% decyl, 10 parts of toluene, and 0.25 part of azobisisobutyronitrile. About a third of this mixture is run into the heated vessel and the rest of the mixture is added thereto over a period of two hours. At this time about 65% of the monomer has formed polymer. Polymerization is continued with formation of base polymer for another 15 minutes. Then there is slowly added 25 parts of vinyl acetate containing 0.15 part of azobisisobutyronitrile, addition being completed at the end of the third hour. After 3⅔ hours of polymerization addition is made of 0.08 part of azobisisobutyronitrile in 5 parts of toluene. Then at 5, 5⅔, and 6⅓ hours addition is made of 0.12 part of this initiator. Heating is thereupon discontinued. The product is a solution of 72.2% of copolymer in toluene. A sample of product adjusted to 30% copolymer content has a viscosity of 62.8 centistokes at 100° F. In the standard test for dispersancy at 150° C. a blend of 2% of this copolymer in light lubricating oil readily disperses 0.4% of asphaltenes.

For purposes of comparison copolymerization is effected under the same conditions using a mixture of 75 parts of the same alkyl methacrylate and 25 parts of the same lot of vinyl acetate. The product is a solution of 71.8% of a conventional copolymer in toluene. A blend of 2% copolymer in the same light lubricating oil failed to exhibit any dispersancy in the standard test at 150° C.

*Example 2*

A copolymerization vessel is used as described in Example 1. A monomer mixture is prepared consisting of 70 parts of laurylmyristyl methacrylate, 5 parts of toluene, and 1.4 parts of a 50% solution of diisopropylbenzene hydroperoxide in alcohol and ketone. About one-third of this monomer mixture is added to the vessel together with 0.28 part of a 25% solution of diisobutylphenoxyethoxyethylbenzyldimethylammonium chloride monohydrate in n-hexanol. Time is now considered 0.0 hours. After 20 minutes addition of the remaining monomer mixture is started and contained at 10-minute intervals. An additional monomer mixture is prepared from 30 parts of vinyl propionate, 0.6 part of 50% diisopropylbenzene hydroperoxide solution and 0.128 part of a 25% solution of diisobutylphenoxyethoxyethylbenzyldimethylammonium chloride monohydrate in m-hexanol. This second monomer mixture is added in 3 portions at 15-minute intervals, starting at 2¼ hours. Addition of 0.4 part of a 50% diisopropylbenzene hydroperoxide solution, 0.08 part of a 25% solution of diisobutylphenoxyethoxyethylbenzyldimethylammonium chloride monohydrate in n-hexanol, and 5 parts of toluene is made at 3.9 hours. Additions of 0.6 part of 50% solution diisopropylbenzene hydroperoxide, 0.12 part of 25% solution of diisobutylphenoxyethoxyethylbenzyldimethylammonium chloride monohydrate in n-hexanol, and 5 parts of toluene are made at 5.0, 5.67, 6.33, and 7.0 hours respectively. At 7.25 hours 120 parts of toluene are added. The reaction is terminated at 7.75 hours. The resulting toluene solution contains 29.4% of copolymer, representing a polymerization yield of 71.5%. In the dispersancy test at 90° C. an oil blend containing 0.25% of copolymer disperses 0.2% of asphaltenes.

A copolymer prepared by a conventional copolymerization method, using a mixture of the same monomers in the same ratio and the same catalyst-activator ratio is not a dispersant for asphaltenes in mineral oil at 90° C.

*Example 3*

A copolymerization vessel is used as described in Example 1. A monomer mixture is prepared from 65.8 parts of lauryl-myristyl methacrylate, 5 parts of toluene and 1.4 parts of a 50% solution of diisopropylbenzene hydroperoxide in acetone and alcohol. About one-third of this monomer mixture is added to the vessel together with 0.28 part of a 25% solution of diiosobutylphenoxyethoxyethylbenzyldimethylammonium chloride monohydrate in n-hexanol. The time is now considered 0.0 hours. After 20 minutes the remaining monomer mixture is added to the vessel in 10 equal portions at 10-minute intervals. An additional monomer mixture is prepared from 34.2 parts of vinyl butyrate, 0.6 part of a 50% diisopropylbenzene hydroperoxide solution, and 0.128 part of a 25% solution of diisobutylphenoxyethoxyethylbenzyldimethylammonium chloride monohydrate in n-hexanol. This second monomer mixture is added in 3 equal portions 15 minutes apart starting at 2.25 hours. Addition of 0.4 part of a 50% diisopropylbenzene hydroperoxide solution, 0.08 part of a 25% solution of diisobutylphenoxyethoxyethylbenzyldimethylammonium chloride monohydrate in n-hexanol and 5 parts of toluene is made at 3.9 hours. Additions of 0.6 part of a 50% solution of diisopropylbenzene hydroperoxide and 0.12 part of a 25% solution of diisobutylphenoxyethoxyethylbenzyldimethylammonium chloride monohydrate in n-hexanol are made at 5.0, 5.67, 6.33, and 7.0 hours, respectively. The reaction is terminated at 7.17 hours after 120 parts of toluene is added. The resulting toluene solution contains 30.8% of copolymer. A sample is transferred to 100 SUS neutral mineral oil by mixing and heating at 105° C./5 mm. for one hour. When tested for dispersancy, 0.5% of copolymer is found to disperse 0.2% of asphaltenes in a representative lube oil at 90° C.

A copolymer prepared by a conventional copolymerization method, with the same monomer and catalyst-activator ratios, fails to exhibit dispersing action in this test.

Example 4

A copolymerization vessel is used as described in Example 1. A mixture is prepared from 20 parts of laurylmyristyl methacrylate, 40 parts of cetyl-stearyl methacrylate in which about 30% is cetyl methacrylate and 68% is stearyl methacrylate with about 2% myristyl methacrylate, 12 parts of methyl acrylate, and 2 parts of a 50% diisopropylbenzene hydroperoxide solution in acetone and alcohol. About one-third of this mixture is run into the heated polymerization vessel at about 90° C. and 0.4 part of 25% lauryldimethylbenzylammonium chloride solution is added. After 20 minutes the remaining mixture is added over 1⅔ hours. Addition is made at 2⅓ hours of 0.08 part of 50% diisopropylbenzene hydroperoxide solution, 0.016 part of 25% lauryldimethylbenzylammonium chloride solution, and 5 parts of toluene. After the conversion to polymer is found to be about 70%, there is then added 28 parts of vinyl acetate in 5 parts of toluene. At 4, 4⅔, 5⅓, and 6 hours respectively there are added 0.024 part of lauryldimethylbenzylammonium chloride in butanol, 0.12 part of a 50% solution of diisopropylbenzene hydroperoxide, and 5 parts of toluene. At 6½ hours 120 parts of toluene is added. Reaction is ended at 7 hours. The product is a solution containing 34.5% of copolymer. A portion of this product is mixed with a 100 SUS neutral oil and this mixture is stirred and heated to 105° C./5 mm. to give a solution of copolymer in oil. This concentrate is used for preparing oil blends at 2%, 1%, 0.5% and 0.25%. All of these disperse asphaltenes in the standard test at 150° C.

Example 5

A polymerization vessel such as described in Example 1 is used. A monomer mixture is prepared from 60 parts of cetyl-stearyl methacrylate, 10 parts of the methacrylate ester of a polyether alcohol made by reacting 30 units of ethylene oxide with lauryl alcohol, and 2 parts of a 50% solution of diisopropylbenzene hydroperoxide. About one-third of the monomer mixture is added to the vessel at about 90° C. with 0.4 part of a 25% solution of diisobutylphenoxyethoxyethylbenzyldimethylammonium chloride monohydrate. Time is counted from this point. After ⅓ hour the remaining monomeric mixture is added in portions to the flask over 1⅔ hours. A separate monomer mixture is made of 30 parts vinyl acetate and 0.8 part of a 50% solution of diisopropylbenzene hydroperoxide. This second monomer mixture is gradually added to the reaction vessel from 2.25 hours to 3.00 hours. Additions of 0.4 part of a 50% solution of diisopropylbenzene hydroperoxide and of 0.08 part of a 25% solution of diisobutylphenoxyethoxyethylbenzyldimethylammonium chloride monohydrate are made at 4 hours. Additions of 0.6 part of a 50% solution of diisopropylbenzene hydroperoxide and 0.12 part of a 25% solution of diisobutylphenoxyethoxyethylbenzyldimethylammonium chloride monohydrate are made at 4⅔, 5⅓, and 6 hours respectively. At 6⅔ hours, heating is stopped and 105 parts of toluene is added. The resulting toluene solution contains 25.2% of copolymer, representing a polymerization yield of 58.4%. The viscosity of this toluene solution at 100° F. is 69.3 centistokes. When tested for dispersancy in oil blends 0.0625% of copolymer disperses 0.2% asphaltenes in an oil blend at 90° C. At 150° C. an oil blend with 1% of copolymer disperses 0.4% asphaltenes.

For purposes of comparison there are mixed 60 parts of the same cetyl-stearyl methacrylate as used above, 10 parts of the same lot of methacrylic ester of lauryloxypolyethoxyethanol with an average of 30 groups as used above, and 30 parts of the same lot of vinyl acetate. This mixture is copolymerized in the conventional way, utilizing the same initiator and activator as used above and in the same amounts. The product is a solution of 25% of a copolymer. While this copolymer gave indication of dispersing action at 90° C., it gave no dispersancy in the standard test at 150° C.

Example 6

A copolymerization vessel is used as described in Example 1. A monomeric mixture is prepared from 40 parts of cetyl-stearyl methacrylate, 10 parts of lauryl-myristyl methacrylate, 10 parts of di-(lauryl-myristyl) fumarate and 0.8 part of a 50% solution of diisopropylbenzene hydroperoxide. About 30% of this monomeric mixture is added to the vessel at about 90° C. with 0.16 part of a 25% solution of diisobutylphenoxyethoxyethylbenzyldimethylammonium chloride monohydrate. This is taken as zero hour in the time schedule. After ⅓ hour, the remaining monomeric mixture is added in portions to the polymerization vessel over a period of 1⅔ hours. A second monomeric mixture is made of 40 parts of vinyl acetate, 0.8 part of a 50% solution of diisopropylbenzene hydroperoxide, and 0.16 part of a 25% solution of diisobutylphenoxyethoxyethylbenzyldimethylammonium chloride monohydrate. This second monomeric mixture is added to the reaction vessel during a ¾-hour period from 2¼ hours to 3 hours. An addition of 0.16 part of a 50% solution of diisopropylbenzene hydroperoxide and of 0.04 part of 25% diisobutylphenoxyethoxyethylbenzyldimethylammonium chloride monohydrate is made at 3⅔ hours. Additions of 0.24 part of a 50% solution of diisopropylbenzene hydroperoxide and of 0.048 part of 25% diisobutylphenoxyethoxyethylbenzyldimethylammonium chloride monohydrate are made at 5, 5.67, 6.33, and 7 hours respectively. At 7 hours 100 parts of toluene is added and heating is terminated at 7¼ hours. The resulting toluene solution contains 30% solids, representing a yield of 63%. The viscosity of this toluene solution is 721.3 centistokes at 100° F. When tested for dispersancy, an oil blend of 0.125% of copolymer disperses 0.2% asphaltene at 90° C. When tested for dispersancy in the standard test at 150° C. an oil blend containing 0.25% of copolymer disperses 0.4% of asphaltenes.

Another copolymer prepared by the same method and based on the same monomer ratios as above is prepared with benzoyl peroxide being used as the catalyst. This copolymerization provides a solution of 26% of copolymer in toluene, a yield of 73.9%. The viscosity of this 26% solution at 100° F. is 261.4 centistokes. When tested for dispersancy, an oil blend containing 0.125% of copolymer disperses 0.2% asphaltenes at 90° C. and an oil blend containing 0.25% of copolymer disperses 0.4% of asphaltenes at 150° C.

Example 7

A copolymerization vessel is used as described in Example 1. A monomeric mixture is prepared from 40 parts of cetyl-stearyl methacrylate, 20 parts of lauryl-myristyl methacrylate, and 1.2 parts of a 50% solution of diisopropylbenzene hydroperoxide. About 30% of this mixture is added to the vessel at 90° C. with 0.24 part of a 25% solution of diisobutylphenoxyethoxyethylbenzyldimethylammonium chloride monohydrate. Time is counted from this point. After ⅓ hour the remaining monomeric mixture is added to the vessel over a 1⅔ hour period. A second monomer mixture is made of 10 parts of vinyl butyrate, 30 parts of vinyl acetate, 0.8 part of a 50% solution of diisopropylbenzene hydroperoxide, and 0.16 part of a 25% solution of diisobutylphenoxyethoxyethylbenzyldimethylammonium chloride monohydrate. This second mixture is added in portions to the vessel between 2¼ hours and 3 hours. At 4 hours, 0.4 part of a 50% solution of diisobutylphenoxyethoxyethylbenzyldimethylammonium chloride monohydrate are added. Additions of 0.6 part of 50% solution of diisopropylbenzene hydroperoxide, 0.12 part of 25% solution of diisobutylphenoxyethoxyethylbenzyldimethylammonium chloride monohydrate, and 20 parts of toluene are made at 4⅔, 5⅓, and 6 hours respectively. A final addition of 3 parts of 50% solution of diisopropylbenzene hydroperoxide and 0.6 part of 25% solution of diisobutylphenoxyethoxyethylbenzyldimethylammonium chloride monohydrate is made at 6⅔ hours. The reaction is terminated after 23 hours when addition of 100 parts of toluene is made. The resulting solution contains 29.8% of copolymer, a copolymerization yield of 60.2%. The viscosity of this toluene solution at 100° F. is 998.5 centistokes. When tested for dispersancy, an oil blend containing 0.0625% of copolymer disperses 0.2% of asphaltenes at 90° C.

Example 8

A copolymerization vessel is used as described in Example 1. A mixture is prepared from 40 parts of cetyl-stearyl methacrylate, 15 parts of lauryl-myristyl methacrylate, 5 parts of styrene, 10 parts of toluene, and 0.5 part of benzoyl peroxide. About 30% of this monomeric mixture is added to the polymerization flask at about 90° C. and time was counted from this addition. After ⅓ hour the remaining monomeric mixture is added to the polymerization vessel during 1⅔ hours. Another mixture is made of 40 parts of vinyl acetate, 10 parts of toluene, and 0.5 part of benzoyl peroxide. This second monomer mixture is added to the reaction vessel over a ¾-hour period from 2¼ to 3 hours. An addition of 0.1 part of benzoyl peroxide and 5 parts of toluene is added at 3⅔ hours. Additions of 0.15 part of benzoyl peroxide and 5 parts of toluene were made at 5, 5⅔, 6⅓, and 7 hours, respectively. At 7½ hours 100 parts of toluene is added and the reaction is terminated at 7⅔ hours. The resulting toluene solution contains 30.0% of copolymer, representing a copolymerization yield of 73.8%. The viscosity of this toluene solution at 100° F. is 82.1 centistokes. An oil blend containing 0.25% of copolymer disperses 0.4% of asphaltenes at 150° C.

Another copolymer is prepared using the same procedure as in Example 8, but with substitution of an equal weight of diethyl itaconate for the styrene. This copolymer is obtained in a yield of 74.2% and the viscosity of a toluene solution containing 30% of copolymer is 164 centistokes at 100° F. When tested for dispersancy, 0.25% of this copolymer in an oil test blend disperses 0.4% of asphaltenes at 150° C.

In the same way there may be copolymerized to form base polymer at least one alkyl methacrylate with an alkyl portion of at least 8 carbon atoms, preferably of 12 to 18 carbon atoms, and in minor proportion other of the various comonomers described above, such comonomer being used in place of the styrene or dilauryl fumarate in the previous examples. The final copolymers are similar in that they exhibit dispersing activity in oils and synthetic lubricants. Of special interest are graft copolymers prepared by delayed addition of vinyl acetate coupled with copolymerization with base polymer and monomer from a mixture of alkyl methacrylate with 12 to 18 carbon atoms in the alkyl portion thereof and alkyl acrylates with one to three carbon atoms in this alkyl portion.

Example 9

A 500 cc. round bottom, 3-necked flask is equipped with a gas inlet tube, a bulb reflux condenser, a glass semicircular stirrer, and an addition funnel. The system is flushed with nitrogen and the internal batch temperature is maintained at 103–105° C. with an oil bath surrounding the reaction vessel.

A monomer mixture is prepared from 70 parts of lauryl acrylate, 50 parts of toluene, and 1.4 parts of a 50% solution of diisopropylbenzene hydroperoxide. Thirty percent of the above catalyzed monomer mixture is added to the flask together with 0.28 part of a 25% solution of diisobutylphenoxyethoxyethylbenzyldimethylammonium chloride monohydrate. The time of this addition is taken as 0.00 hour. After 0.33 hour the remaining monomeric mixture is added to the flask over 1.67 hours. A separate monomeric mixture is made of 30 parts vinyl acetate, 0.6 part of a 50% solution of diisopropylbenzene hydroperoxide and 0.12 part of a 25% solution of diisobutylphenoxyethoxyethylbenzyldimethylammonium chloride monohydrate. This second monomer mixture is added to the reaction vessel over a period of 45 minutes from 2.25 hours to 3.00 hours. An addition is made at 3.67 hours of 0.2 part of a 50% solution of diisopropylbenzene hydroperoxide and 0.04 part of a 25% solution of diisobutylphenoxyethoxyethylbenzyldimethylammonium chloride monohydrate. Additions of 0.3 part of a 50% solution of diisopropylbenzene hydroperoxide and 0.06 part of a 25% solution of diisobutylphenoxyethoxyethylbenzyldimethylammonium chloride monohydrate are made to the flask at 5.00, 5.67, 6.33, and 7.00 hours, respectively. At 7.50 hours the heating is stopped. The resulting toluene solution contains 55.7% of copolymer. The viscosity of a toluene solution adjusted to 30.0% of copolymer is 45.6 centistokes at 100° F.

To 50 g. of the solution containing 55.7% of copolymer in toluene is added 25 g. of a 100 neutral oil. This mixture is stripped for 1 hour at 130° C. at 5 mm. of mercury. The resulting mixture weighs 55.3 g. To adjust this solution to 30% of copolymer, 37.6 g. of the 100 neutral oil is added and the mixture is stirred for one-half hour. The viscosity of the oil solution containing 30% of copolymer is 1424 centistokes at 210° F. When this copolymer is tested for dispersancy, 0.125% of copolymer disperses 0.2% of asphaltenes in an oil test blend at 90° C. and 1% of copolymer disperses 0.4% of asphaltenes in an oil test blend at 150° C.

For purposes of comparison a mixture of 70 parts of lauryl acrylate and 30 parts of vinyl acetate in 50 parts of toluene is likewise polymerized by heating to 103–105° C. in the presence of the same proportions of diisopropylbenzene hydroperoxide and the above-noted quaternary salt for seven hours. The resulting product is a 35.6% solution of a copolymer, which is adjusted with toluene to 30% of copolymer, to give a solution having a viscosity of 245 cs. at 100° F. This copolymer fails to exhibit any dispersancy at 2% in an oil blend, but at 90° C. it gave some evidence of dispersing action.

Example 10

Polymerization comprised a 2-liter, 3-necked round bottom flask fitted with a cold water condenser, inlet tube for nitrogen, graduated dropping funnel, thermometer, and a semi-circular glass stirrer operating at approximately 180 r.p.m. The flask is heated with an oil bath with an electric heating coil. There is weighed out 198.4 g. of lauryl-myristyl methacrylate of 98.2% purity.

To the polymerization flask are charged 4.5 g. of maleic anhydride, 5.0 g. of methyl ethyl ketone (solvent for maleic anhydride), a 60.0 g.-portion of the lauryl-myristyl methacrylate, and 0.75 g. of a 12.5% solution of $\alpha,\alpha'$-azodiisobutyronitrile in chloroform. The charge is stirred and the batch heated to 90° C. After 15 minutes addition of the rest of the lauryl-myristyl methacrylate is begun from the dropping funnel and continued over a period of 1¾ hours. After 2¼ hours have elapsed, addition of 100.5 g. of vinyl acetate is started from the dropping funnel and continued dropwise over a period of 45 minutes, which brings the total time to three hours. During this 3-hour period there are made at 15-minute intervals additions of 0.75 g. each of a 12.5% $\alpha,\alpha'$-azodiisobutyronitrile chloroform solution. Catalyst additions were then made each 20 minutes for a period of 5 hours in amounts of 0.41 g. of the same 12.5% azo catalyst solution. The total amount of catalyst used during the entire 8 hours of polymerization is 0.635% of $\alpha,\alpha'$-azodiisobutyronitrile based on the weight of pure monomers. The temperature during the entire reaction is kept within the range of 80–90° C. After the polymerization has proceeded for 4½ hours, 25 g. of white polymerization oil is added. Upon the completion of an 8-hour polymerization period, the batch is stripped for 1 hour at 125° C. at 15 mm. pressure. The batch then is diluted with 100 SUS oil to 40% solids. Upon evaluation of this copolymer as a dispersant, it is found that 0.25% of copolymer disperses 0.4% of asphaltenes in an oil test blend at 150° C.

When the above starting monomers are mixed at the start and then polymerized by a similar schedule, the resulting copolymer is rather weak in dispersing activity. At 0.25%, for example, the copolymer evidences no such action at 150° in an oil blend containing 0.4% of asphaltenes although dispersing activity is evident at 1% or 2% in oil blends tested at 90° C.

Especially useful copolymers comparable to the graft copolymer of Example 10 may be prepared with proportions of maleic anhydride varying from about 1% to about 5%. These copolymers exhibit unusual stability under some conditions of use in addition to other properties.

Copolymers of this invention, typical illustrations of which have been presented in the above examples, may be dissolved in mineral oils or in synthetic lubricants to improve the properties of the resulting compositions. The extent of improvement in various properties will depend upon such factors as choice of comonomers, proportions thereof, and the type and size of final copolymer. When a sufficient proportion of vinyl acetate, propionate, and/or butyrate is graft copolymerized to the base polymer by delayed addition, the resulting copolymers provide compositions which exhibit good dispersant activities. By choice of hydrocarbon groups along the polymer chain copolymers can be prepared which emphasize improvements in viscosity-temperature relationships and/or changes in pour point and copolymers can be prepared to meet requirements in different types of oils and oils of different viscosities.

To demonstrate the effect of graft copolymers of this invention, oil blends were prepared by mixing a concentrate of a given copolymer with lubricating oil to provide compositions containing 2% or 1% of copolymer. These compositions were subjected to standard evaluations. In one series of such compositions at 100 neutral oil was used having a pour point of 0° C. and viscosities of 4.05 cs. at 210° F. and 21.27 cs. at 100° F.

A blend containing 1% of the copolymer of Example 1 was found to have a pour point (A.S.T.M.) of −60° F., while a 2% solution in the same oil had a pour point of −55° F. Viscosities of the 1% solution were 4.84 cs. at 210° F. and 25.56 cs. at 100° F.

A 1% solution of the copolymer of Example 5 in the above oil was found to have a pour point of 0° F. and to have viscosities of 4.67 cs. at 210° F. and 24.29 cs. at 100° F., corresponding to a viscosity index of 124. Viscosities of a 2% solution in the same oil were 5.45 cs. and 28.28 cs. at 210° F. and 100° F. respectively, corresponding to a viscosity index of 139.

A 1% solution of the copolymer of Example 6 in the above oil had a pour point of −15° F. and viscosities of 5.62 cs. at 210° F. and 29.19 cs. at 100° F., giving a viscosity index of 141. Viscosities of a 2% solution were 8.07 cs. and 41.91 cs. at 210° F. and 100° F. respectively, giving a viscosity index of 149.

A 1% solution of the copolymer of Example 7 had a pour point of −20° F. and viscosities of 5.76 cs. at 210° F. and 29.10 cs. at 100° F., corresponding to a viscosity index of 146. A 2% solution had viscosities of 8.42 cs. and 41.41 cs. at 210° F. and 100° F. respectively, corresponding to a viscosity index of 154.

A 1% solution of the copolymer of Example 8 had a pour point of −25° F. and viscosities of 4.89 cs. at 210° F. and 26.49 cs. at 100° F., giving a viscosity index of 121. A 2% solution had viscosities of 6.07 cs. and 33.86 cs. at 210° F. and 100° F. respectively, corresponding to a viscosity index of 134.

Graft copolymers formed by polymerizing vinyl acetate, propionate, and/or butyrate onto a base polymer formed chiefly from one or more acrylic esters have advantages over somewhat comparable copolymers formed by grafting vinyl acetate onto a base polymer from other types of polymerizable esters. The graft copolymers utilizing an acrylic ester base polymer are more effective as dispersants and are more reproducibly prepared and formed in desired molecular sizes from relatively small to very large.

Molecular weights of final copolymers may be varied from about 11,000 to 2,000,000 or more. In the range up to about 375,000 (viscosity average) the polymers provide stability to shear coupled with improvements in viscosity index and also dispersancy. Higher molecular weights provide increasing improvements in viscosity and viscosity-temperature relationships.

There may be used from about 0.1% to 10% of one or more of the copolymers of this invention in mineral oils to provide lubricating compositions. Other types of oil additives may also be present in these compositions.

Base oils vary in viscosity from that of spindle oils to that of oils for reciprocating aircraft engines. Oils used in preparing the compositions include those identified as S.A.E. 10 to 50 used in sparking combustion and compression ignition engines and also multiple branded oils, such as S.A.E. 10W–20 or 10W–30, which have become practical through use of polymers, including the graft copolymers of this invention. These copolymers also find use in hydraulic fluids, automatic transmission fluids, gear oils, and greases. They may also be used in synthetic lubricants, such as diesters, polyethers, silicate esters, phosphates, and silicone fluids.

In the formulations of lubricating compositions it is common to use many types of additives, such as anti-oxidants, stabilizers, anti-wear agents, anti-squawk agents, oiliness agents, corrosion inhibitors, foam suppressors, high temperature detergents, other low temperature detergents, other viscosity index improvers, or other pour point depressors. Such materials include tert-alkylamines, 4,4′-methylenebis(2,6 - di - tert - butylphenol), trialkylphenols, tris(dimethylaminomethyl)phenol, phenothiazine, phenyl-α-napthylamine, phenyl-β-naphthylamine, zinc dialkyldithiophosphates, zinc dicyclohexyldithiophosphate, zinc diphenyldithiophosphate, barium dialkyldithiophosphate, nickel dialkyldithiophosphates, barium, strontium, or calcium pertroleum sulfonate (including both normal and basic sulfonates), alkaline earth metal alkyl benzene or naphthalene sulfonates, alkaline earth metal alkylphenates or alkylsalicylates, normal or basic aluminum naphthenates, alkaline earth metal phenylstearates, alkaline earth metal salts of polyphenyl sulfides and alkylphenol-formaldehyde condensates, tricresyl phosphate, chloroalkyl phosphates, liquid silicones such as polymethylsiloxanes, octylphenoxyethoxyethoxyethanol, nonylphenoxypolyethoxyethanols, alkenylsuccinic anhydride and salts derived therefrom, sulfurized sperm oil or terpenes, polyisobutylenes, copolymers of higher alkyl acrylates and/or methacrylates or of these and lower acrylic esters and similar copolymers containing polar moieties from such comonomers as dimethylaminoethyl methacrylate, vinyl pyridines, N-vinyl-2-pyrrolidinone, or alkoxypolyethoxyethyl methacrylates.

Some typical formulations of lubricating compositions, prepared by dissolving additives in a neutral oil, are as follows:

(1) 1% of zinc dialkyldithiophosphate, 2% of a basic calcium petroleum sulfonate, 1% of a copolymer of stearyl, lauryl, and butyl methacrylates, and 2% of a copolymer prepared according to the process of this invention from 40 parts by weight of cetyl-stearyl methacrylate, 20 parts of lauryl acrylate, and 10 parts of octyl-decyl methacrylate and then 30 parts of vinyl acetate;

(2) 1% of zinc dialkyldithiophosphate, 2% of a basic barium alkylarene sulfonate, 0.25% of octylphenoxyethoxyethoxyethanol, 1% of a copolymer of cetyl, lauryl, and ethyl methacrylates, 0.5% of tert-alkylamines averaging 14 carbon atoms, and 2% of a copolymer of this invention from 75 parts of lauryl-myristyl methacrylate and 25 parts of vinyl acetate which was incorporated by catalyzed delayed addition;

(3) 1% of 4,4'-methylenebis(2,6-di-tert-butylphenol), 3% of a basic calcium salt of a diisobutylphenol-formaldehyde condensate, and 3% of a copolymer of this invention from stearyl, lauryl, and butyl methacrylates (75%) and vinyl acetate (25%); and (4) 1% of zinc dialkyldithiophosphate, 1% of polyisobutylene, 0.5% of a pour depressant copolymer from stearyl, lauryl, and octyl methacrylates, and 3% of a copolymer of this invention from stearyl and lauryl methacrylates, dibutyl itaconate, and vinyl acetate (30%).

Graft copolymers prepared according to the method of this invention appear to be more stable than conventional or random copolymers from the same materials or copolymers prepared from other types of ethylenically unsaturated monomers even though addition of vinyl acetate or other lower carboxylate is delayed. The improved stability of copolymers of this invention is reflected in greater resistance to shearing conditions, to oxidating cleavage, and to thermal cracking. As a result, compositions containing these copolymers remain effective over a longer time. The endurance of lubricating compositions is thus extended or less copolymer may be used to provide an equivalent endurance.

Copolymers of this invention may also be used in petroleum distillates for burner oils, furnace oils, diesel fuels, jet fuels, and gasolines. Usually, the presence of 0.001% to 0.1% is sufficient to disperse gums or resins which may form on storage in such distillates.

I claim:

1. A process for preparing oil-soluble copolymers having dispersing activity which comprises first polymerizing under the influence of a free radical polymerization initiator at least one acrylic ester until about 50% to about 90% has polymerized to form a mixture of base polymer and monomer, said ester supplying solubility to the final copolymer in hydrocarbon oils and having the formula $$CH_2=C(R^*)COOR$$

wherein $R^*$ is a member of the class consisting of hydrogen and methyl and R is an alkyl group of 8 to 24 carbon atoms, mixing at least one vinyl ester with said base polymer and monomer, said vinyl ester being of the formula $$CH_2=CHOOCR'$$

wherein $R'$ is an alkyl group of 1 to 3 carbon atoms, and copolymerizing the resultant mixture under the influence of a free radical polymerization initiator, the vinyl ester providing about 25% to 45% of the final copolymer.

2. A process for preparing oil-soluble copolymers having dispersing activity which comprises first copolymerizing under the influence of a free radical polymerization initiator at least one acrylic ester together with a minor proportion of at least one other free radically polymerizable monoethylenically unsaturated monomer until about 50% to 90% of said ester and said monomer have polymerized to form a mixture of base polymer and monomer, said acrylic ester having the formula $$CH_2=C(R^*)COOR$$

wherein $R^*$ is a member of the class consisting of hydrogen and methyl and R is an alkyl group of 8 to 24 carbon atoms, the average size of alkyl being sufficient to provide oil-solubility of the final copolymer, mixing with said base polymer and monomer at least one vinyl ester of the formula $$CH_2=CHOOCR'$$

wherein $R'$ is an alkyl group of 1 to 3 carbon atoms, and copolymerizing the resultant mixture under the influence of a free radical polymerization initiator, the vinyl ester providing about 25% to 45% of the final copolymer.

3. A process for preparing oil-soluble copolymers having dispersing activity which comprises first copolymerizing under the influence of a free radical polymerization initiator at least one acrylic ester of the formula $$CH_2=C(R^*)COOR$$

wherein $R^*$ is a member of the class consisting of hydrogen and methyl and R is an alkyl group of 8 to 18 carbon atoms, the average size of alkyl being sufficient to provide oil-solubility of the final copolymer, together with a minor proportion of at least one other free radically polymerizable comonomer from the class consisting of alkyl esters of maleic, fumaric, and itaconic acids, acrylic, methacrylic, maleic, fumaric, and itaconic acids, maleic anhydride, maleic half amides, acrylic amides, acrylonitrile, methacrylonitrile, vinyl alkyl ethers, vinyl alkyl thioethers, styrene, alkylstyrenes, and lower alkyl acrylic esters, continuing copolymerization until about 50% to 90% of said acrylic ester and said other comonomer have polymerized to form a mixture of base polymer and monomers, mixing with said base polymer and monomers at least one vinyl ester of the formula $$CH_2=CHOOCR'$$

wherein $R'$ is an alkyl group of 1 to 3 carbon atoms, and copolymerizing the resultant mixture under the influence of a free radical polymerization initiator, the vinyl ester providing about 25% to 45% of the final graft copolymer.

4. A process for preparing oil-soluble copolymers having dispersing activity which comprises first polymerizing under the influence of a free radical polymerization initiator at least one alkyl methacrylate having an alkyl portion of 8 to 18 carbon atoms and of sufficient size to impart to the final copolymer solubility in hydrocarbon liquids until about 50% to 90% of said alkyl methacrylate has polymerized, whereby a mixture of base polymer and monomer forms, mixing with said base polymer and monomer at least one vinyl ester of the formula $$CH_2=CHOOCR'$$

wherein $R'$ is an alkyl group of 1 to 3 carbon atoms, and copolymerizing the resultant mixture under the influence of a free radical polymerization initiator, the vinyl ester providing about 25% to 45% of the final copolymer.

5. A process for preparing oil-soluble copolymers having dispersing action which comprises first polymerizing under the influence of a free radical polymerization initiator at least one alkyl methacrylate in which the alkyl portion contains 12 to 18 carbon atoms until about 50% to 90% thereof has polymerized, whereby a mixture of base polymer and monomer forms, mixing with said base polymer and monomer vinyl acetate in a proportion providing about 25% to 45% of the final copolymer, and copolymerizing the resultant mixture under the influence of a free radical polymerization initiator.

6. A process for preparing oil-soluble copolymers having dispersing activity which comprises first polymerizing a mixture of alkyl methacrylates having alkyl groups of 12 to 18 carbon atoms under the influence of an initiator comprising a hydroperoxide and a quaternary ammonium salt until 50% to 90% thereof has polymerized, whereby base polymer is formed, then mixing with said base polymer vinyl acetate in a proportion providing about 25% to 45% of the final copolymer, and graft copolymerizing the resultant mixture under the influence of a hydroperoxide-quaternary salt initiator system.

7. A process for preparing oil-soluble graft copolymers having dispersing action which comprises first polymerizing under the influence of a free radical polymerization initiator at least one alkyl acrylate in which the alkyl portion contains 12 to 18 carbon atoms until 50% to 90% thereof has polymerized, whereby base polymer forms, then mixing with said base polymer vinyl acetate in a proportion providing 25% to 45% of the final copolymer, and graft copolymerizing the resultant mixture under the influence of a free radical polymerization initiator.

8. A process for preparing oil-soluble graft copolymers having dispersing activity which comprises first polymerizing under the influence of a free radical polymerization initiator system comprising a hydroperoxide and a quaternary ammonium salt a mixture of at least one alkyl methacrylate in which the alkyl portion contains 12 to 18 carbon atoms and a minor proportion of an alkyl acrylate having one to four carbon atoms in the alkyl portion thereof, continuing polymerization until 50% to 90% of said alkyl methacrylate and said alkyl acrylate have copolymerized to form base polymer, then mixing with said base polymer at least one vinyl ester of the formula $$CH_2=CHOOCR'$$

wherein R' is an alkyl group of one to three carbon atoms, and graft copolymerizing the resultant mixture under the influence of an initiator system comprising a hydroperoxide and a quaternary ammonium salt.

9. A process for preparing oil-soluble graft copolymers having dispersing activity which comprises first polymerizing under the influence of a free radical polymerization initiator at least one acrylic ester and maleic anhydride until 50% to 90% thereof has formed base polymer, said ester supplying solubility to the final copolymer in hydrocarbon oils and having the formula $$CH_2=C(R^*)COOR$$

wherein R* is a member of the class consisting of hydrogen and methyl and R is an alkyl group of 8 to 24 carbon atoms, the maleic anhydride being used in a proportion supplying 1% to 5% by weight of the final copolymer, then mixing with said base copolymer vinyl acetate and graft copolymerizing the resultant mixture under the influence of a free radical polymerization initiator, the vinyl acetate providing about 25% to 45% of the final graft copolymer.

10. An oil-soluble graft copolymer exhibiting dispersing activity and having a base polymer from at least one acrylic ester of the formula $$CH_2=C(R^*)COOR$$

wherein R* is a member of the class consisting of hydrogen and methyl and R is an alkyl group of 8 to 24 carbon atoms, and having graft polymerized thereto a vinyl ester of the formula $$CH_2=CHOOCR'$$

wherein R' is an alkyl group of one to three carbon atoms, the vinyl ester portion comprising about 25% to 45% of the graft copolymer and the acrylic ester having an alkyl portion of sufficient size to provide solubility of the graft copolymer in hydrocarbon oils, in which said copolymer is prepared according to the process of claim 1.

11. An oil-soluble graft copolymer exhibiting dispersing activity and having a base polymer from at least one acrylic ester of the formula $$CH_2=C(R^*)COOR$$

and at least one other free radically polymerizable monoethylenically unsaturated monomer in minor proportion, R* being a member of the class consisting of hydrogen and methyl and R being an alkyl group of 8 to 24 carbon atoms, the proportion of said acrylic ester being sufficient to provide solubility in hydrocarbon oils for the graft copolymer and having graft polymerized to said base polymer at least one vinyl ester of the formula $$CH_2=CHOOCR'$$

wherein R' is an alkyl group of one to three carbon atoms, said vinyl ester providing about 25% to 45% of the graft copolymer, in which said copolymer is prepared according to the process of claim 1.

12. An oil-soluble graft copolymer exhibiting dispersing activity and having a base polymer from alkyl methacrylates with 12 to 18 carbon atoms in the alkyl portion and having graft polymerized thereto vinyl acetate, the vinyl acetate portion of the graft copolymer comprising about 25% to 45% thereof, in which said copolymer is prepared according to the process of claim 1.

13. An oil-soluble graft copolymer exhibiting dispersing activity and having a base polymer from at least one alkyl methacrylate having 12 to 18 carbon atoms in the alkyl portion copolymerized with maleic anhydride, said anhydride providing 1% to 5% of the final graft copolymer and having grafted onto said base polymer vinyl acetate in a proportion of about 25% to 45% of the final graft copolymer, in which said copolymer is prepared according to the process of claim 1.

14. An oil-soluble graft copolymer exhibiting dispersing activity, having a base polymer from at least one alkyl methacrylate in which the alkyl portion contains 12 to 18 carbon atoms and a minor proportion of an alkyl acrylate having one to four carbon atoms in the alkyl portion thereof, and having graft polymerized to said base polymer vinyl acetate in a proportion providing 25% to 45% of the graft copolymer, in which said copolymer is prepared according to the process of claim 1.

References Cited by the Examiner

UNITED STATES PATENTS

| | | | |
|---|---|---|---|
| 2,837,496 | 6/1958 | Vandenberg | 260—885 |
| 2,892,793 | 12/1959 | Stewart et al. | 260—885 |
| 2,926,126 | 2/1960 | Graham et al. | 260—885 |
| 2,965,572 | 12/1960 | Wuellner et al. | 260—885 |
| 3,067,163 | 12/1963 | Bauer | 260—885 |
| 3,124,552 | 3/1964 | Tirtiaux et al. | 260—885 |
| 3,202,627 | 8/1965 | Van Ess et al. | 260—880 |

FOREIGN PATENTS 824,920  12/1959  Great Britain.

MURRAY TILLMAN, *Primary Examiner.*

JAMES A. SEIDLECK, *Examiner.*

N. W. SHUST, J. T. GOOLKASIAN,
*Assistant Examiners.*